United States Patent [19]
Lee et al.

[11] Patent Number: 5,883,824
[45] Date of Patent: Mar. 16, 1999

[54] PARALLEL ADDING AND AVERAGING CIRCUIT AND METHOD

[75] Inventors: Ruby Bei-Loh Lee, Los Altos Hills, Calif.; John Paul Beck, Tyngsborough, Mass.

[73] Assignee: Hewlett-Packard Company, Palo Alto, Calif.

[21] Appl. No.: 158,649

[22] Filed: Nov. 29, 1993

[51] Int. Cl.$^6$ .................................. G06F 7/38; G06F 7/50
[52] U.S. Cl. ...................... 364/734; 364/749; 364/786.01
[58] Field of Search ...................................... 364/749, 786, 364/750.5, 745, 734

[56] References Cited

U.S. PATENT DOCUMENTS

| | | | |
|---|---|---|---|
| 3,987,291 | 10/1976 | Gooding et al. | |
| 4,137,568 | 1/1979 | Dlugas | 364/734 |
| 4,707,800 | 11/1987 | Montrone et al. | 364/786 X |
| 4,768,160 | 8/1988 | Yokoyama | 364/749 X |
| 4,789,953 | 12/1988 | Gerrath | 364/734 X |
| 4,914,617 | 4/1990 | Putrino et al. | 364/786 |
| 5,047,975 | 9/1991 | Patti et al. | 364/786 |
| 5,189,636 | 2/1993 | Patti et al. | 364/786 |

OTHER PUBLICATIONS

Ire Wescon Convention Record, Paper 16/4, Sep. 1977, North Hollywood, CA USA "The Next Generation Four–Bit Bipolar Microprocessor Slice", Coleman et. al., pp. 1–19.

Information Processing Letter, Amsterdam, Jul. 1977, vol. 3, No. 6, "Should The Stable Rounding Rule Be Radix–Dependent?", Keir, pp. 188–189.

Patent Abstracts of Japan, vol. 9, No. 13, (P–328) Jan. 19, 1985, Pat. No. P59161731, (Hitachi Seisakusho) * Abstract*.

Patent Abstracts of Japan, vol. 10, No. 175, (E–413) Jun. 20, 1986, Pat. No. P61024331, (Nippon Denki) * Abstract*.

*Primary Examiner*—Tan V. Mai

[57] ABSTRACT

An apparatus that can also be used for generating the average of two integers. The apparatus can be divided into a plurality of sub-adders that operate on sub-words of the input integers in parallel. Hence, the adder can be used for adding or subtracting one set of two integers wherein each integer is of some predetermined length or a plurality of sets of two integers provided the sum of the lengths of the integers is less than or equal to this predetermined length. The apparatus can also generate the sum, or difference, of each of the sub-words divided by two. The parallel operations can be carried out in response to a single instruction. The results of the division by two are rounded in a manner that eliminates biasing of the results.

18 Claims, 4 Drawing Sheets

PARALLEL ADDING AND AVERAGING CIRCUIT AND METHOD

FIELD OF THE INVENTION

The present invention relates to computers, and more particularly, to arithmetic units for use therein.

BACKGROUND OF THE INVENTION

Computers normally include an arithmetic logic unit that includes an adder that adds numbers of some maximum number of bits. Adders for words of length 32 and 64 bits are common in microprocessors and the like. While these adders will also operate on much smaller words, when doing so, the majority of the logic circuits contained in the adders are idle. For example, a 64-bit adder can be used to add two 8-bit words by placing each of the 8-bit words in the least significant portion of a corresponding 64-bit word and then adding the 64-bit words. During the addition, the logic circuitry concerned with adding the 7 high order bytes of each of the words is effectively idle. Hence, $\frac{7}{8}^{ths}$ of the capacity of the adder is being wasted during this operation.

Computations involving the addition of a large number of pairs of small words are often encountered in multi-media data processing. For example, consider the problem of adding two gray-scale images to generate a sum image. The pixels of the images are typically stored as one byte integers representing the light intensity at a corresponding point in the image. Since storage space is always at a premium, the pixels of the image are typically packed into words. If the basic word size on the computer is 32-bits, the pixels could be packed four per word. Each image may have a million pixels. Hence, the computation of the sum image involves adding two pixels from the component image to generate a corresponding pixel in the sum image. If there are a million pixels in each image, a million such additions must be performed. Each addition requires the "unpacking" of two words, one from each component image, the addition of the two unpacked bytes, and then the storage of the result in the correct byte of a word in the sum image.

If the basic word size of the computer is 32-bits, the computer will normally have a 32-bit adder. During these computations, 75% of the adding capacity of the adder will be idle. Hence, a conventional arithmetic logic unit is not being used optimally when performing this type of image calculation.

The computation times encountered in these types of operations can be excessive. Hence, special parallel computer architectures are often employed to reduce the time between the execution of the sum image command and the time at which the sum image is completed. Since all of the additions are independent of each other, the adds can be performed in parallel without regard to ordering. A computer with M adders can, in principle, provide a result in $1/M^{th}$ the time provided the movement of the pixels from memory to the adders does not become a bottleneck. Hence, it would be advantageous to provide a computer architecture in which multiple additions can be performed in parallel. Unfortunately, the cost of providing these additional adders and the hardware needed to control them is often prohibitive.

It should also be noted that the image addition problem discussed above often includes generating an average image. An image having pixels that are the average of the corresponding pixels in the component images is equivalent to generating the pixels of the sum image discussed above and then dividing the intensity of each of the sum image pixels by 2. This type of image computation is preferred since it prevents overflows. If the two corresponding component image pixel values have values greater than 128, then the sum image pixel cannot be represented as an 8-bit integer. To avoid this problem, the average image is used, since the average image pixels will always be representable as one byte integers if the component image pixels were one byte integers.

Broadly, it is the object of the present invention to provide an improved adder.

It is a further object of the present invention to provide an adder that operates at high efficiency when multiple additions involving words that are smaller than the width of the adder are added.

It is yet another object of the present invention to provide an adder that can generate the average of two numbers in a single machine cycle.

It is a still further object of the present invention to provide an adder that is adapted for computing a plurality of average values of pairs of numbers that are smaller than the width of the adder.

These and other objects of the present invention will become apparent to those skilled in the art from the following detailed description of the invention and the accompanying drawings.

SUMMARY OF THE INVENTION

The present invention is an arithmetic logic unit that can also be used for generating the average of two integers. The arithmetic logic unit includes an adder that can be divided into a plurality of sub-adders that operate on sub-words of the input integers in parallel. Hence, the adder can be used for adding one set of two integers wherein each integer is of some predetermined length or a plurality of sets of two integers provided the sum of the lengths of the integers is less than or equal to this predetermined length. The adder is constructed from a plurality of adder stages connected in an ordered sequence. Each adder stage operates on one or more bits to generate sum bits and a carry output bit. Disconnect circuitry is provided at the potential boundaries of sub-words to prevent the carry output from propagating across sub-word boundaries when the input words are partitioned into sub-words.

In embodiments of the present invention having the ability to compute the average of two operands, each output bit of the arithmetic logic unit includes a multiplexer that implements a right shift operation on the results generated by the sub-adders. The multiplexer connected to the most significant bit of a result connects that bit to the carry bit generated by the addition of the most significant bits of the corresponding sub-words. The multiplexers connected to the least significant bit of each result may be modified to implement a round-odd rounding scheme to prevent biasing of the average results.

DETAILED DESCRIPTION OF THE INVENTION

Figure 1:
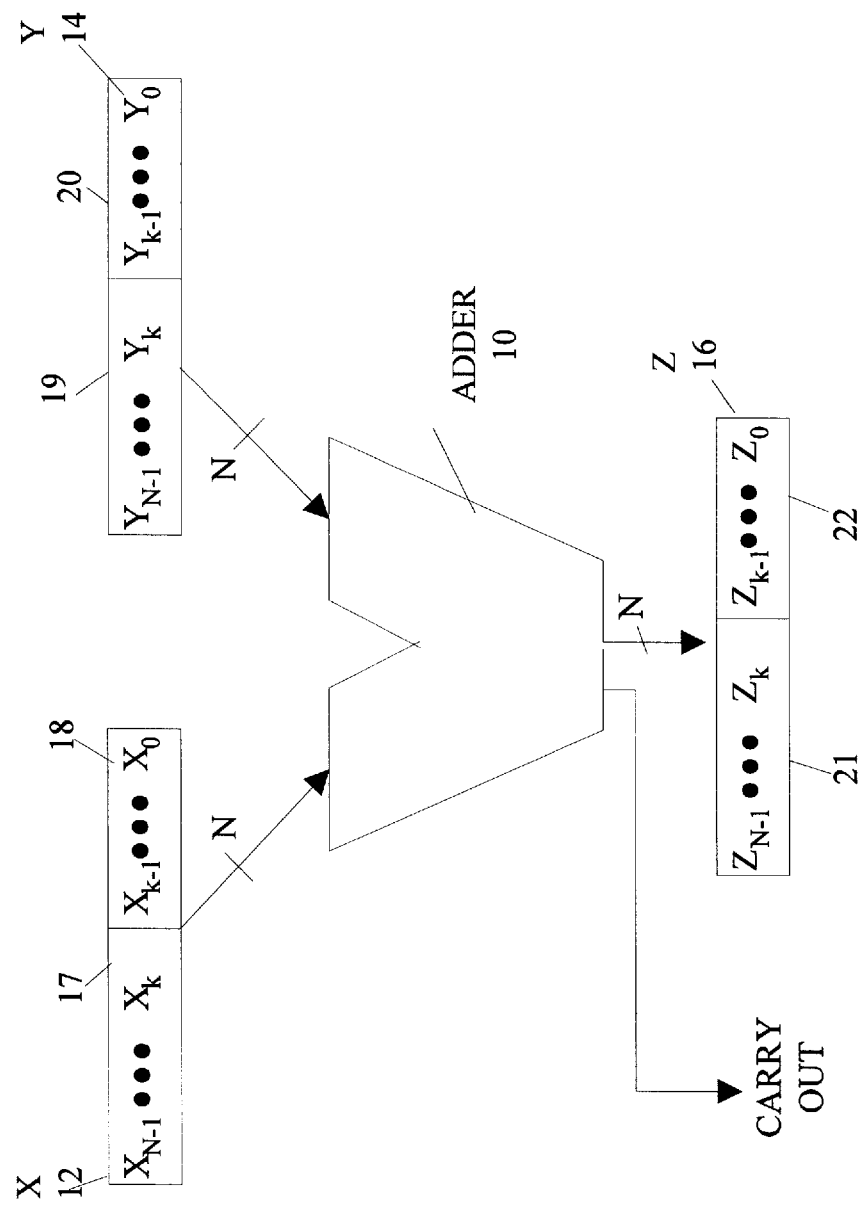
FIG. 1 is a block diagram of an adder according to the present invention.

The present invention is an improved adder that can be configured to perform a plurality of partial word adds or averaging operations in parallel. Referring to FIG. 1, an adder 10 according to the present invention accepts two N-bit operands 12 and 14. The bits of the first operand will be denoted by $X_i$, for i=0 to N−1, the bits of the second operand will be denoted by $Y_i$. The operands are typically stored in two of the registers in the processor of the computer. However, the present invention could be implemented in forms of circuitry that are not included in computers. When operated as a conventional adder, adder 10 generates an N bit output word 16 having the two's complement sum of X and Y and a 1-bit carry-out. The bits of output 16 of adder 10 will be denoted by $Z_i$ in the following discussion. The result of the addition is typically stored back into one of the CPU registers.

In the following discussion, the bits in the various words will be numbered from least significant to most significant. That is, $X_0$ is the least significant bit of operand X, and $X_{N-1}$ is the most significant bit of the X operand. The same convention will be used for the Y and Z words.

The present invention allows each of the operands to be divided into a plurality of sub-words. For simplicity, the present invention will be explained first in terms of a single division of each of the operands into partial operands. In this case, the first k bits of the X operand, $X_0$ through $X_{k-1}$, are the bits of the first partial operand 18 of the X word, and the remaining bits, $X_k$ through $X_{N-1}$ are the bits of the second partial operand 17 of the X word. The Y operand is similarly divided into partial words 19 and 20. In this mode, bits $Z_0$ through $Z_{k-1}$ are the bits of the sum of partial operands 18 and 20, and bits $Z_k$ through $Z_{N-1}$ are the bits of the sum of partial operands 17 and 19, respectively. These two results will be referred to as partial or sub-word sums in the following discussion. As will be explained in more detail below, the present invention may also be used to compute the average value of each of two partial operands. If the average is being computed, bits $Z_0$ through $Z_{k-1}$ are the bits of the average of partial operands 18 and 20, and bits $Z_k$ through $Z_{N-1}$ are the bits of the average of partial operands 17 and 19, respectively.

Figure 2:
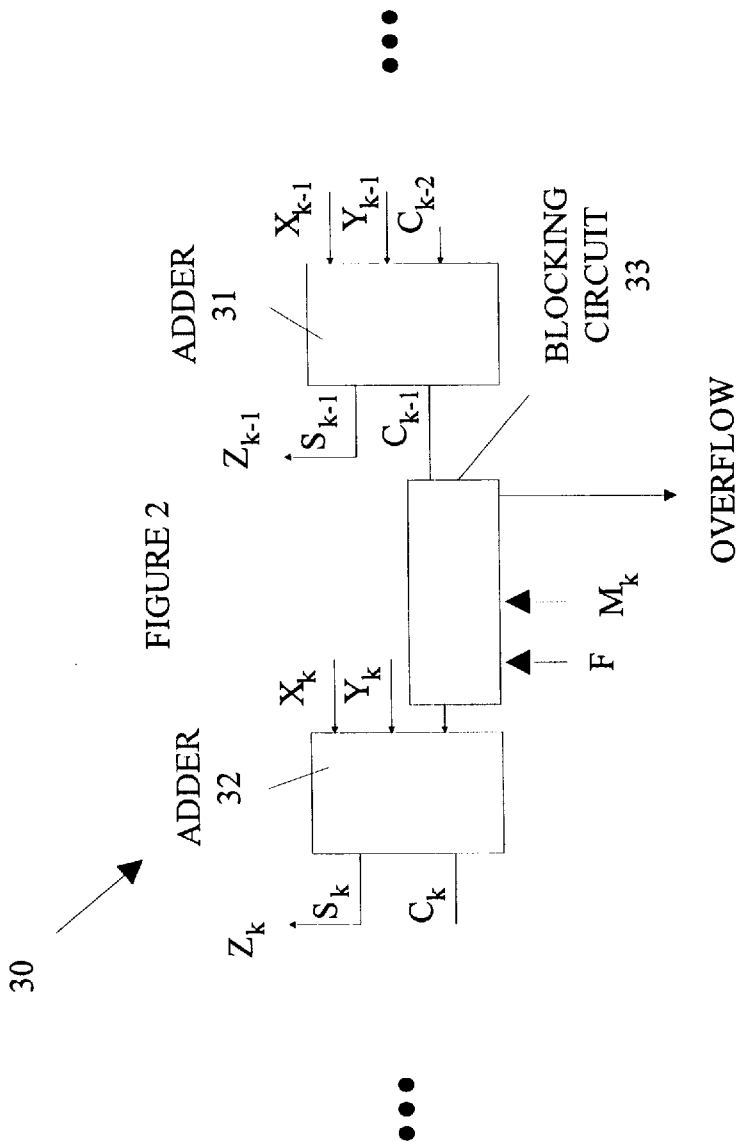
FIG. 2 is a block diagram of a portion of an adder according to the present invention which only performs additions.

The present invention will be explained first in terms of an adder constructed from single bit adding stages which utilize a ripple carry architecture, also known as carry propagate architecture. The manner in which the teachings of the present invention can be utilized on other adder architectures will be discussed in more detail below. Refer now to FIG. 2 which is a block diagram of a portion of an adder 30 according to the present invention which only performs additions. That is, adder 30 does not perform averaging calculations. Adder 30 is constructed from an array of one bit adder stages. The present invention differs from a conventional adder in that the stages may be decoupled to allow the adder to perform parallel additions on the partial words. Each single bit adder adds two bits, one from the X operand and one from the Y operand, and a carry bit from the previous stage in the adder, denoted by $C_i$ for the $i^{th}$ stage, to generate a sum bit and a new carry bit. The two stages shown in FIG. 2 are the single bit adders used to add the most significant bits of partial operands 18 and 20 and the least significant bits of partial operands 17 and 19. Single bit adder 31, for example, adds bits $C_{k-2}$, $X_{k-1}$ and $Y_{k-1}$ to generate sum bit $S_{k-1}$ and carry bit $C_{k-1}$. In the following discussion the stage of the adder that adds bits $X_p$ and $Y_p$ to generate a sum bit $S_p$ will be referred to as the $p^{th}$ stage of the adder. In a conventional adder utilizing carry propagation, the carry bit from each stage is propagated to the next stage by connecting the carry bit input of each stage to the carry bit output of the stage before it in the array of one bit adders.

In the present invention, the carry bit from the stage just before the boundary separating the two partial operands is connected to a blocking circuit 33. If adder 30 is being used as a conventional adder operating on the entire contents of registers 12 and 14 treated as single words, blocking circuit 33 connects the carry output of single bit adder 31 to the carry input of single bit adder 32. If adder 30 is being used to perform two adds in parallel with partial word boundary between bits k−1 and k in each register, then blocking circuit 33 merely prevents the carry bit from single bit adder 31 from propagating to the carry input of single bit adder 32. This is accomplished in response to a 1-bit signal $M_k$. The manner in which the bits $M_k$ are specified will be discussed in more detail below. The carry outputs of all of the other single bit adders are connected in the conventional manner in the remaining stages of adder 30. Hence, carry bits propagate in the conventional manner within each section of adder 30 that is operating on a particular partial operand. The sum bits from each adder stage are connected to the corresponding bits of the output port.

In conventional adders, the carry bit from the single bit adder operating on the most significant bit of the operands is used to detect overflows. If this feature is to be implemented for each of the partial operands, the carry bit from the most significant bit additions of each of the partial operands is connected to an appropriate overflow circuit. In one embodiment of the present invention, the carry bits are ORed together and the resultant bit used to detect an overflow. This bit can be used to trigger a trap on overflow or it may be ORed with the contents of a single bit register. In the later case, the program can check the contents of the register to determine if any operation since the last time the register was checked has resulted in an overflow.

If no averaging computations are to be implemented, the present invention can be constructed from a conventional adder merely by including a blocking circuit such as blocking circuit 33 between each pair of stages that could span the boundary between two partial operands. If the X and Y inputs are to be divisible into an arbitrary number of partial operands of arbitrary size, then a blocking section is included between each pair of single bit adders. The blocking sections are configured by a mask having bits $M_k$ that specify the location of the most significant bit of each partial operand. This mask will be referred to as the boundary mask in the following discussion. The bits of the mask may be stored in a register in the adder or may be generated directly from the instruction being executed by the instruction decoding circuitry of the processor in which the adder is located.

The above embodiment of the present invention performs additions of the operands. Blocking circuit 33 replaces the carry bit by 0 during an addition in which the adder is divided into sub-adders with a boundary at the blocking circuit. If the adder is to be also used for 2's complement subtractions in which the adder is likewise divided, the carry bit must be forced to be a 1 instead of a 0. Blocking circuit 33 shown in FIG. 2 implements both additions and subtractions by providing an input F having a value of either "0" or "1". When a boundary is active at blocking circuit 33, the value of F is the value presented to the next stage. If the boundary is inactive, then blocking circuit 33 merely transmits the carry bit, $C_{k-1}$, to the next stage.

The above-described embodiments of the present invention do not perform averaging computations. While these embodiments provide significant advantages over the prior art, the preferred embodiment of the present invention provides additional hardware that provides the capability of computing averages. The additional hardware required to perform averaging computations will now be discussed. The average of two operands is the sum of the two operands divided by two. A division by two is equivalent to shifting the sum of the two operands to the right by one bit. The least significant bit of the sum is lost. The most significant bit of the average is the carry output of the single bit adder operating on the most significant bit of the partial operands. For example, the average of partial operands 18 and 20 can be computed by routing $S_i$ to $Z_{i-1}$ for i=1, . . . ,k-1, discarding $S_0$, and routing $C_{k-1}$, to $Z_{k-1}$.

For any given division of the inputs into partial operands, there are three types of stages. The stage adding the least significant bits of the partial operands discards its sum bit when performing an average computation. This type of stage will be referred to as a least significant bit stage in the following discussion. The stage adding the most significant bits of a partial operand must route the carry bit generated thereby to the most significant bit of the result, and its sum bit to the next most significant bit of the result in addition to breaking the carry propagation chain. This type of stage will be referred to as a most significant bit stage in the following discussion. Stages that add bits between the least and most significant bits must route their sum bits to a location one position to the right of the position used when the stages performed addition. That is, the $i^{th}$ stage routes its sum bit to $Z_{i-1}$. This type of stage will be referred to as an interior bit stage in the following discussion.

While embodiments in which the partial operand boundaries may be located at arbitrary points in the words are possible, in general, it is more useful to provide for boundaries at only a few positions. For example, if the adder is to be used in a computer which normally adds 32 bit words, boundaries separating the 4 bytes of such words are more useful, since partial operands will typically be one or two bytes in such a system. In this case, each adder stage must be capable of functioning in at most two of the three roles described above. Stage (N−1) needs only perform as a most significant bit stage. Similarly, stage 0 needs only to perform as a least significant bit stage. All other stages must be capable of operating as interior bit stages when the adder is used for full word additions. In addition, those stages that can become the most or least significant bit stages of a parallel sub-word add or average must be capable of switching to those configurations.

Figure 3:
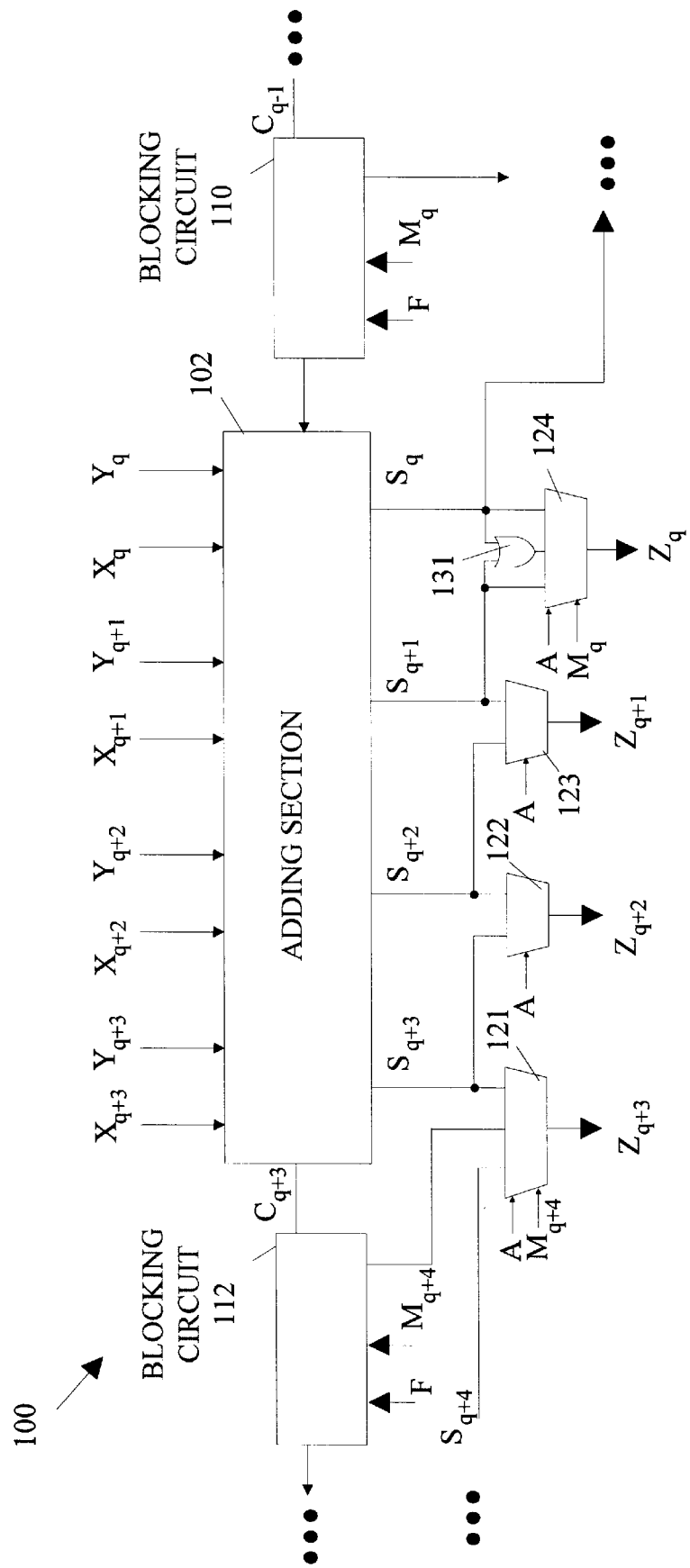
FIGS. 3 is a block diagram of a portion of an adder according to the present invention.

The differences between the stages lies in the manner in which the sum signals, $S_i$, generated by each adder stage are routed to the output bits, $Z_i$, of the adder rather than by the details of how the adder stages generate the sum bits from the bits of the X and Y registers. Refer now to FIG. 3 which is a block diagram of a portion of an adder 100 according to the present invention. Adder 100 is constructed from a plurality of 4-bit adding sections of which adding section 102 is exemplary. Adding section 102 operates on bits q through q+3 of the X and Y registers to generate sum bits $S_q$ through $S_{q+3}$. Each adding section is functionally equivalent to 4 of the single bit adders described above in that each adding section receives 4 bits from the X register, 4 bits from the Y register and generates the corresponding four sum bits. In addition, adding section 102 generates a carry bit $C_{q+3}$ and receives carry bit $C_{q-1}$. Blocking circuits 110 and 112 are shown on each side of adding section 102.

Adder 100 generates N sum bits, $S_i$, for i=0 to N−1. When adder 100 is utilized as a single operand adder, the $i^{th}$ sum bit, $S_i$, is routed to the $i^{th}$ output bit, $Z_i$, of the adder. Each output line $Z_i$ is connected to a multiplexer. Exemplary multiplexers are shown at 121–124 in FIG. 3. The multiplexers are controlled by an average signal A. If A is false, $S_i$ is coupled to $Z_i$ for i=0 to N−1. If A is true, there are three possibilities as described above with respect to the types of stages. Those multiplexers that are connected to output lines that can only be interior bits of a result, connect $S_{i+1}$ to $Z_i$. Multiplexers 122 and 123 are examples of such multiplexers.

The second type of multiplexers are those that are connected to output lines that can either be an internal bit or a most significant bit of a result. Such a multiplexer is shown at 121. These multiplexers will be referred to as most significant bit multiplexers. A most significant bit multiplexer is a 3-to-1 multiplexer which operates in response to A and the mask bit that determines if the multiplexer is connected to a most significant bit of a result. If A is false, then a most significant bit multiplexer connects $Z_i$ to $S_i$. If A is true and the mask bit is also true, then a most significant bit multiplexer connects $Z_i$ to $C_i$, where $C_i$ is the carry bit generated by the stage that generated $S_i$. If A is true and the mask bit is false, then the most significant bit multiplexer connects $Z_i$ to $S_{i+1}$. It should be noted that the multiplexer connected to $Z_{N-1}$ is a most significant bit multiplexer in which a 2-to-1 multiplexer is sufficient, since this multiplexer can never be an interior multiplexer.

The third type of multiplexers are those that are connected to output lines that can either be an internal bit or a least significant bit of a result. Such a multiplexer is shown at 124. These will be referred to as least significant bit multiplexers. If the result of the average operation is to be truncated, i.e., the bit shifted out is to be ignored in determining the result, a least significant bit multiplexer is the same as an internal bit multiplexer.

While truncation may be used as a method of rounding the result of an integer divide by shifting right, it can cause undesirable problems that can be prevented by other forms of rounding. Consider the case in which an image is to be reduced in size by averaging adjacent pixels in the image. That is, each group of 4 pixels is to be replaced by one pixel having a value equal to the average of the 4 pixels replaced. The image is represented by an I×I pixel array. The pixel reduction can be accomplished by averaging the odd and even rows in the array to generate an I×I/2 pixel array. The odd and even columns of this intermediate array are then averaged to generate the final (I/2)×(I/2) array. If the various averaging operations always round down, the final image will have different statistical properties than the original image. For example, the reduced image will have a lower average light intensity then the original array. It is often important that this type of artifact be avoided. The present invention provides a means for avoiding this type of biased rounding.

In the preferred embodiment of the present invention, round odd logic is used to prevent this biasing. In round odd systems, the result is rounded to the nearest odd integer if a round off error is created by the right shift. If the answer is exact before rounding, no change is made. A round off error occurs whenever a 1 is shifted off the result. This occurs when the least significant bit before shifting is a "1". In this case, the least significant bit of the result is set to a "1". If the bit shifted out is a "0", then the result was exact even after the shift, and the least significant bit of the result is unaltered. The present invention utilizes round odd because a round odd system can be implemented by the addition of a single OR gate 131 to the multiplexer. Hence, in a least significant bit multiplexer in which unbiased rounding is used, the multiplexer selects the signal ($S_{i+1}$ OR $S_i$) for connection to $Z_i$ when A is true and the mask bit indicates that the multiplexer in question is the least significant bit of a result. When A is false, $S_i$ is connected to $Z_i$. When A is true and the mask bit indicates that the output line is connected to an internal bit of a result, the multiplexer connects $Z_i$ to $S_{i+1}$.

It can be shown that the average error obtained with this form of rounding is zero provided the S values are uniformly distributed. It should be noted that a round even system also prevents biasing in rounding. In a round even system, the result is rounded to the nearest even integer if a round off error occurs and the result prior to rounding was odd. However, the hardware needed to implement a round even scheme is significantly more complex.

Figure 4:
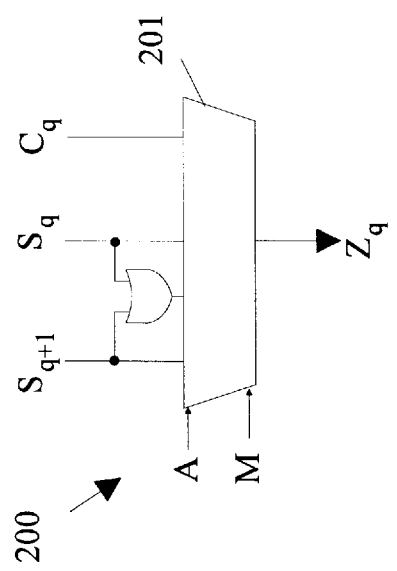
FIG. 4 is a block diagram of a multiplexer arrangement that may be utilized in constructing embodiments of the present invention.

The above-described multiplexers assumed that only a limited number of potential partial operand boundaries are implemented. If, however, the adder is to have arbitrary boundaries, then the multiplexer attached to each output line, other than the $0^{st}$ and $(N-1)^{th}$ stages, must be capable of functioning any of the three possible multiplexer functions. A block diagram of a multiplexer arrangement 200 that provides these functions is shown in FIG. 4. Multiplexer arrangement 200 is constructed from a 4-to-1 multiplexer 201. It is assumed that the multiplexer is connected to output line $Z_q$ in the following discussion. Multiplexer 201 either couples $S_{q+1}$, $S_q$, $C_q$ or ($S_{q+1}$ OR $S_q$) to $Z_q$ depending on the state of the average signal and mask bits. Since multiplexer 201 must function properly both as a least significant bit multiplexer or a most significant bit multiplexer, it must be able to determine the state of both $M_q$ and $M_{q+1}$.

In addition to providing parallel addition or averaging in an adder having a complexity only slightly greater than a conventional adder, the present invention also improves the overall computational efficiency of many types of computation in which the data is packed into words at the beginning of the computation. Consider the image size reduction problem discussed above as it would be carried out on a computer having a 32-bit word size. If each pixel is represented by a one byte integer, the image data will typically be packed into words to save storage space. Hence, each horizontal line in the image will be represented by I/4 32-bit words. To add the pixels of an odd numbered line to those of the even numbered line following it, a word containing 4 pixels of the odd numbered line can be input to the X register and the corresponding word from the even numbered line input to the Y register. The contents of the Z register can then be stored directly to memory as one packed word of the resultant image line. This operation can be carried out without having to unpack the individual bytes and repack the result. Hence, the present invention allows 4 pixels to be processed with a single add instruction and avoids the packing and unpacking instructions needed with conventional adders. Finally, the present invention automatically generates the average of the two pixels, thereby eliminating one shift operation after each add.

Furthermore, the parallel sub-word add instruction is no more complex than a conventional full word add instruction. In a conventional full word add, the programmer specifies two registers having the operands and a third register to hold the result. The present invention, likewise, requires only the specification of three registers. If only a few possible configurations of the adder in partial operand fields are possible, these configurations can be included in the add instruction and the instruction decode circuitry can then generate the corresponding mask bits. Hence, no additional instructions are needed to setup the adder.

The above discussion assumed that the input and output words were stored in processor registers. Embodiments of the present invention in which the output, and/or input, values are sent to or received from locations specified in the add or average instructions will be apparent to those skilled in the art. For example, the add instruction could specify a plurality of registers to receive the sums, each sum being loaded in the least significant bits of the register. Similarly, the result could be sent directly to locations other than register, e.g. memory or other functional units. In addition, it will be apparent that the operands could originate from other functional units or memory.

While the above embodiments have been described in terms of parallel partial sub-word averaging, it will be apparent to those skilled in the art that the present invention may also be used to perform an averaging instruction on the entire contents of the X and Y words. Such an embodiment provides the benefit of two operations, i.e., add and divide by two, in one machine cycle.

The above embodiments of the present invention have been described in terms of carry propagation type adders. In the preferred embodiment of the present invention, carry-look ahead architecture is used because it has smaller delays. In carry look-ahead adders, the carry generation circuitry produces a propagate and a generate signal corresponding to each bit of the adder. These signals may be used in a manner analogous to the carry bits described above to allow the adder to be broken into parallel sub-word adders. Consider the case in which the adder is to be divided such that stage k operates on the most significant bit of the sub-word result. A blocking circuit such as blocking circuit 33 shown in FIG. 2 can be inserted into the carry generation logic such that the propagate bit and the generate bit are forced to the appropriate values depending on the type of operation, i.e., addition or subtraction, that is being performed. When the adder is being used on words that are not broken at stage k, the blocking circuit does not alter the values of the propagate and generate bits corresponding to stage k.

While the above embodiments of the present invention have been described in terms of instructions as the means for triggering the various operations performed by the present invention, it will be apparent to those skilled in the art that the operations of the present invention may be triggered by electrical signals that are not generated by instructions of a stored computer program. Hence, the term "instruction" when used in the claims shall also include operations triggered by other forms of signaling. Furthermore, it will be apparent to those skilled in the art that the present invention may be used in circuitry that is not part of a computer.

While the above embodiments of the present invention have been described in terms of averaging unsigned integers, it will be apparent to those skilled in the art that the teaching of the present invention may be applied to signed integers. In this case, instead of moving the carry out bit from the most significant bit of the sum into the most significant bit of the result, the later is determined as follows: If the two operands are of the same sign, then the most significant bit of the result is the carry out bit as before. If the two operands are of different signs, then the most significant bit of the result is the most significant bit of the sum prior to the right shift. That is, the most significant bit of the result will be ($X_p$ AND $Y_p$) OR ($X_p$ OR $Y_p$) AND $\overline{C}_{p-1}$. In the case of a carry look-ahead adder, this expression reduces to $G_p$ OR $P_p$ AND $\overline{C}_{p-1}$, where $G_p$ and $P_p$ are the generate and propagate bits associated with the most significant bit.

Various modifications to the present invention will become apparent to those skilled in the art from the foregoing description and accompanying drawings. Accordingly, the present invention is to be limited solely by the scope of the following claims.

What is claimed is:

1. An apparatus for operating on the contents of an X word having bits $X_i$ and a Y word having bits $Y_i$ to generate a result word having bits $Z_i$, where i=0 to N−1, where $Z_0$ is the least significant bit of one of said sub-words and $Z_{N-1}$ is the most significant bit of one of said sub-words, said apparatus comprising:

means for partitioning said X, Y and result words into a plurality of sub-words, there being one sub-word of said Y and result words corresponding to each sub-word of said X word;

means, responsive to a first instruction, for generating the sum of each X sub-word and the corresponding Y sub-word, the result thereof determining said corresponding sub-word of said result word; and means, responsive to a second instruction, for generating the sum divided by two of each sub-word in said X word and the corresponding sub-word in said Y word, the result thereof determining said corresponding sub-word of said result word.

2. The apparatus of claim 1 wherein said apparatus comprises means for operating on one or more bits from said X word and corresponding bits derived from said Y word, and means for generating a generate bit and a propagate bit corresponding to each said bit of said X word, and wherein said partitioning means comprises means for forcing said generate bit and said propagate bit to values determined by the operation being performed if said bit of said X word is the most significant bit of a sub-word.

3. The apparatus of claim 2 wherein said operating means generates N result bits, $S_i$, for i=0 to N−1, $S_i$ being derived from operations on $X_i$, and wherein said apparatus further comprises N multiplexing means, each said multiplexing means generating a signal indicative of one of said result bits, there being one said multiplexing means for each said result bit $Z_p$, for p=0 to N−1, said multiplexing means corresponding to $Z_p$ connecting $S_p$ to $Z_p$ in response to said first instruction.

4. The apparatus of claim 3 further comprising means for generating a carry bit, $C_p$, corresponding to each bit $X_p$ that is a most significant bit of a sub-word and wherein said multiplexing means corresponding to $Z_p$ connects $Z_p$ to $S_{p+1}$ in response to said second instruction if $Z_p$ is interior to one of said sub-words and to $C_p$ if $Z_p$ is the most significant bit of one of said result sub-words, wherein $C_p$ is said carry bit generated by said adding stage operating on the most significant bit of said X sub-word corresponding to said result sub-word containing $Z_p$.

5. The apparatus of claim 4 wherein said multiplexing means corresponding to $Z_p$ further comprises means to connect $Z_p$ to ($S_{p+1}$ OR $S_p$) if $Z_p$ is the least most significant bit of one of said result sub-words.

6. The apparatus of claim 3 further comprising means for generating a carry bit, $C_p$, corresponding to each bit $X_p$ that is a most significant bit of a sub-word and wherein said multiplexing means corresponding to $Z_p$ connects $Z_p$ to $S_{p+1}$ in response to said second instruction if $Z_p$ is interior to one of said sub-words and to $S_p$ if $Z_p$ is the most significant bit of one of said result sub-words.

7. The apparatus of claim 1 wherein said apparatus comprises a plurality of adding stages connected in series, each said adding stage comprising means for operating on one or more bits from said X word and corresponding bits derived from said Y word, and means for propagating a carry bit from said adding stage to the next said adding stage in said series connection, and wherein said partitioning means comprises means for forcing said carry bit to a value determined by the operation being performed if said adding stages operate on bits of different sub-words in said X word.

8. The apparatus of claim 7 wherein said adding stages generate N result bits, $S_i$, for i=0 to N−1, $S_i$ being derived from operations on $X_i$, and wherein said apparatus further comprises N multiplexing means, each said multiplexing means generating a signal indicative of one of said result bits, there being one said multiplexing means for each said result bit $Z_p$, for p=0 to N−1, said multiplexing means corresponding to $Z_p$ connecting $S_p$ to $Z_p$ in response to said first instruction.

9. The apparatus of claim 8 wherein said multiplexing means corresponding to $Z_p$ connects $Z_p$ to $S_{p+1}$ in response to said second instruction if $Z_p$ is interior to one of said sub-words and to $C_p$ if $Z_p$ is the most significant bit of one of said result sub-words, wherein $C_p$ is said carry bit generated by said adding stage operating on the most significant bit of said X sub-word corresponding to said result sub-word containing $Z_p$.

10. The apparatus of claim 9 wherein said multiplexing means corresponding to $Z_p$ further comprises means to connect $Z_p$ to ($S_{p+1}$ OR $S_p$) if $Z_p$ is the least most significant bit of one of said result sub-words.

11. An apparatus for operating on the contents of an X word having bits $X_i$ and a Y word having bits $Y_i$ to generate a result word having bits $Z_i$, where i=0 to N−1, where $Z_0$ is the least significant bit of one of said sub-words and $Z_{N-1}$ is the most significant bit of one of said sub-words, said apparatus comprising:

means for partitioning said X, Y and result words into a plurality of sub-words, there being one sub-word of said Y and result words corresponding to each sub-word of said X word;

means, responsive to a first instruction, for generating the sum of each X sub-word and the corresponding Y sub-word, the result thereof determining said corresponding sub-word of said result word; and means, responsive to a second instruction, for generating the sum divided by two of each sub-word in said X word and the corresponding sub-word in said Y word, the result thereof determining said corresponding sub-word of said result word, wherein each of said results is rounded to the next highest odd integer if said division by two resulted in a round off error.

12. An apparatus for operating on the contents of an X word having bits $X_i$ and a Y word having bits $Y_i$ to generate a result word having bits $Z_i$, where i=0 to N−1, where $Z_0$ is the least significant bit of one of said sub-words and $Z_{N-1}$ is the most significant bit of one of said sub-words, said apparatus comprising:

means for partitioning said X, Y and result words into a plurality of sub-words, there being one sub-word of said Y and result words corresponding to each sub-word of said X word;

means, responsive to a first instruction, for generating the sum of each X sub-word and the corresponding Y sub-word, the result thereof determining said corresponding sub-word of said result word; and means, responsive to a second instruction, for generating the difference of each sub-word in said X word and the corresponding sub-word in said Y word, the result thereof determining said corresponding sub-word of said result word; and means, responsive to a third instruction, for generating the difference divided by two of each sub-word in said X word and the corresponding sub-word in said Y word, the result thereof determining said corresponding sub-word of said result word.

13. An apparatus for operating on the contents of an X word having bits $X_i$ and a Y word having bits $Y_i$ to generate a result word having bits $Z_i$, where i=0 to N−1, where $Z_0$ is the least significant bit and $Z_{N-1}$ is the most significant bit, said apparatus comprising:

means, responsive to an average instruction, for generating the sum of said X and Y words; and means for shifting said sum to generate said Z word.

14. The apparatus of claim 13 wherein said apparatus comprises a plurality of adding stages connected in series, each said adding stage comprising means for operating on adding one or more bits from said X word to corresponding bits derived from said Y word, and wherein said adding stages generate N result bits, $S_i$, for i=0 to N−1, $S_i$ being derived from operations on $X_i$, and a carry out bit $C_{N-1}$, and wherein said apparatus further comprises N multiplexing means, each said multiplexing means generating a signal indicative of one of said result bits, there being one said multiplexing means for each said result bit $Z_p$, for p=0 to N−1, said multiplexing means corresponding to $Z_p$ connecting $S_p$ to $Z_p$ in response to said average instruction.

15. The apparatus of claim 14 wherein said multiplexing means corresponding to $Z_p$ connects $Z_p$ to $S_{p+1}$ in response to said average instruction for p=0 to N−2 and to $C_{N-1}$ if p=N−1.

16. The apparatus of claim 15 wherein said multiplexing means corresponding to $Z_p$ further comprises means to connect $Z_p$ to ($S_{p+1}$ OR $S_p$) if p=0.

17. The apparatus of claim 13 further comprising means, responsive to a difference instruction, for generating the difference divided by two of said X word and said Y word, the result thereof determining said result word.

18. An apparatus for operating on the contents of an X word having bits $X_i$ and a Y word having bits $Y_i$ to generate a result word having bits $Z_i$, where i=0 to N−1, where $Z_0$ is the least significant bit and $Z_{N-1}$ is the most significant bit, said apparatus comprising:

means, responsive to an average instruction, for generating the sum of said X and Y words; and means for shifting said sum to generate said Z word, wherein said Z word is rounded to the next highest odd integer if said shift resulted in a round off error.

* * * * *